United States Patent [19]

Noshi

[11] Patent Number: 5,201,405
[45] Date of Patent: Apr. 13, 1993

[54] TRAY CONVEYOR

[75] Inventor: Shinji Noshi, Kyoto, Japan

[73] Assignee: Murata Kikai Kabushiki Kaisha, Kyoto, Japan

[21] Appl. No.: 872,591

[22] Filed: Apr. 23, 1992

[30] Foreign Application Priority Data

Apr. 26, 1991 [JP] Japan ................................ 3-29558[U]

[51] Int. Cl.$^5$ ............................................ B65G 47/84
[52] U.S. Cl. .......................... 198/803.01; 198/803.12; 198/841; 242/35.5 A
[58] Field of Search ............... 198/465.1, 487.1, 626.4, 198/626.6, 803.01, 803.12, 841; 242/35.5 A

[56] References Cited

U.S. PATENT DOCUMENTS

| 3,144,927 | 8/1964 | Buccicone | 198/841 |
| 4,215,776 | 8/1980 | Esler | 198/841 |
| 5,011,000 | 4/1991 | Kawasaki et al. | 198/465.1 |
| 5,074,407 | 12/1991 | Brumby | 198/841 |
| 5,097,943 | 3/1992 | Kawasaki et al. | 198/841 |

FOREIGN PATENT DOCUMENTS

| 314089 | 5/1989 | European Pat. Off. | 198/465.1 |
| 4024163 | 2/1991 | Fed. Rep. of Germany | 198/465.1 |

Primary Examiner—Joseph E. Valenza
Attorney, Agent, or Firm—Spensley Horn Jubas & Lubitz

[57] ABSTRACT

In a tray conveyor for conveying trays carrying spinning bobbins and the like thereon, an elastic member of convex cross section is mounted on the opposite side of a surface of a conveyor belt for conveying trays vertically, extending in the direction of travel of the conveyor.

6 Claims, 2 Drawing Sheets

TRAY CONVEYOR

BACKGROUND OF THE INVENTION

1. Field of the Invention

The present invention relates to a tray conveyor for conveying trays loaded with spinning bobbins and the like.

2. Description of the Prior Art

Generally, a belt conveyor is used to convey trays each carrying a spinning bobbin erected thereon. In this case, it is preferable that if a change in the direction of travel of conveyor is demanded on the way, the use of no special lift mechanism be required, that is, the same conveyor in current use be able to convey the trays in directions desired.

As shown in FIG. 3, this type of a prior-art tray conveyor is directly connected to an automatic winder 3 and a spinning frame 2 for conveying for example a full bobbin 1, and includes an ascending zone vertically rising from the spinning frame 2, a horizontal zone 5 for horizontally carrying the bobbin at the elevated level, and a descending zone 6 lowering on the automatic winder 3 side. In the ascending zone 4 and the descending zone 6, the tray T is tilted down, as if twisted, to come into engagement with the end face of the conveyor belt 7, thus moving on the belt. In these vertical zones 4 and 6, there can be provided a traffic space S for persons and cargoes.

In these vertical zones 4 and 6, as shown in FIG. 4, leaf springs 10 are installed at a specific spacing on the back side 7 (on the opposite side of the conveyor surface 8) of the conveyor belt 7 to press with their force the conveyor belt 7 against the tray T side, thus obtaining a contact pressure needed to convey the tray T held between the conveyor belt 7 and a guide 11.

The above-described prior-art tray conveyor, however, has such a problem that the leaf springs (springs) 10 of special shape will become necessary and further a larger number of parts including mounting bolts 12 and an increased manpower for assembling these parts will be required.

Since the leaf springs 10 partly exert a force to the conveyor bolt 7, a uniform contact pressure to be applied in the direction A of travel of conveyor could not be obtained. Therefore the tray conveyor requires the use of a flat belt, as the conveyor belt, having greater rigidity, becoming a very expensive equipment. Further, since the spring force becomes weak in an intermediate area between the leaf springs 10, the conveyor belt tends to deflect as indicated by an alternate long and short line in FIG. 4. Particularly when the trays T are conveyed in succession, there will occur such a problem as jamming of the trays T on the conveyor.

OBJECT AND SUMMARY OF THE INVENTION

In view of the above-described disadvantages, the present invention has been accomplished to provide a tray conveyor which is capable of obtaining a uniform contact pressure in the direction of travel of conveyor despite of its simple construction.

In the present invention, the elastic member having a convex cross section extends in the direction of travel of conveyor, on the opposite side of the conveyor belt surface on which the trays are carried vertically.

The elastic member of the above-described constitution continuously applies a force to the conveyor belt in the direction of travel of conveyor, thus insuring the contact pressure to the trays.

DESCRIPTION OF THE PREFERRED EMBODIMENT

Hereinafter a preferred embodiment of a tray converter according to the present invention will be described with reference to the accompanying drawings.

Figure 1:
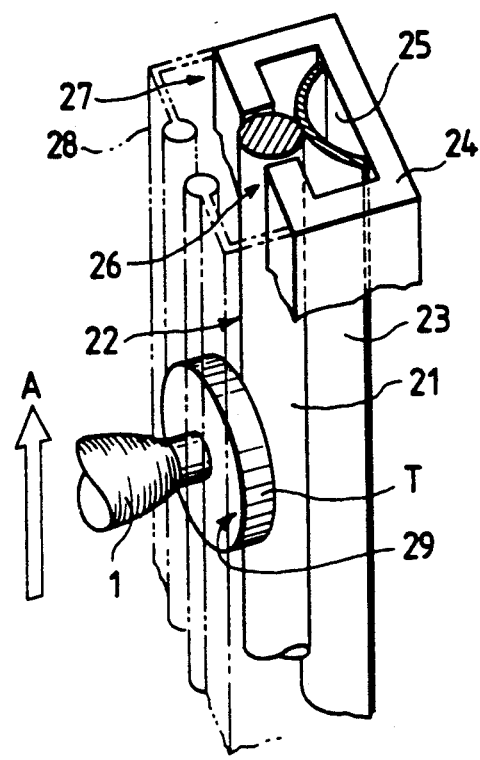
FIG. 1 is a partly broken perspective view showing one embodiment of a tray conveyor according to the present invention.

FIG. 1 shows one example of the tray conveyor of the present invention, in which the same members as those used in the prior art are designated by the same reference numerals, and will not be explained.

The tray conveyor has an elastic member 23 of convex cross section which extends in the direction A of conveyance, on the opposite side of the surface 22 of the conveyor belt 21 for vertical conveyance of trays T. In the present invention, the conveyor belt 21 is a round belt having a round section.

The elastic member 23 is produced of a steel sheet having a specific thickness and housed within a guide member 24 of a square section installed between vertical zones of conveyance. And this elastic member 23 supported with the inner wall 25 of the guide member 24 is set such that the top section thereof will contact the conveyor belt 21, applying a force leftward in the drawing.

The conveyor belt 21 is situated in the opening section 26 of the guide member 24, which constrains the movement of the belt in a direction intersecting the direction A of conveyance. At the end 27 on the opening side of the guide member 24, a tray guide 28 for guiding the tray T is installed, being engaged with the bobbin-side surface of the tray T (the upper surface of the tray T during horizontal conveyance) 29.

The tray T thus constituted is carried upward and downward by the circulating drive of the conveyor belt 21, being invertedly held between the conveyor belt 21 and the tray guide 28. That is, the simple convex elastic member 23 presses the conveyor belt 21 against the tray T side, thereby enabling the vertical conveyance of the tray T, a large decrease in the number of components between the vertical zones, and accordingly a reduction in mounting man-hours.

Since the elastic member 23 exerts an uniform spring force in the direction A of conveyance, no jamming of trays T on the conveyor will occur if a spacing between the trays T has become narrow. Further the conveyor belt 21 is not demanded to have high rigidity. That is, the round belt as shown in FIG. 1 is sufficient, and accordingly the reduction of cost of components has been achieved.

Furthermore the present embodiment is easily and widely applicable to conventional tray conveyors.

Figure 2:
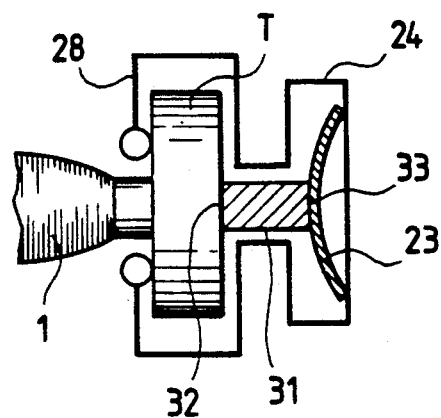
FIG. 2 is a sectional view showing another embodiment of the present invention.
Figure 3:
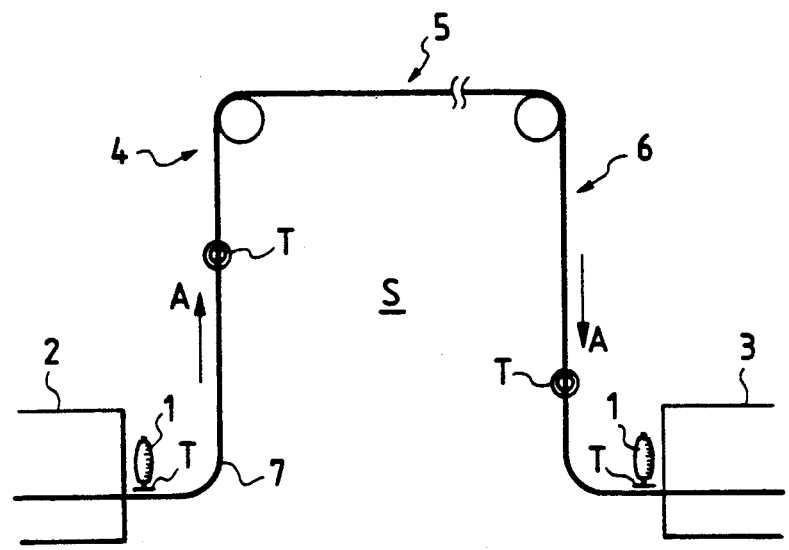
FIG. 3 is a side view showing a conventional tray conveyor.
Figure 4:
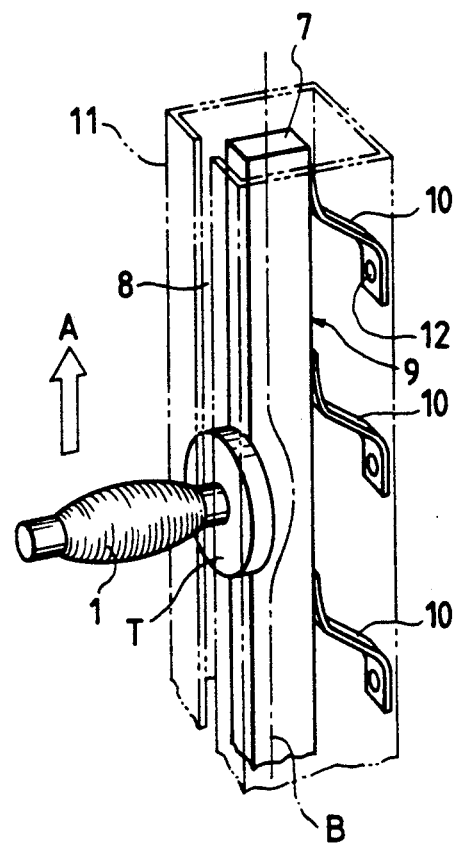
FIG. 4 is a perspective view showing a major portion of FIG. 3.

It should be understood that the conveyor belt is not limited to the round belt of the above-described embodiment, but a flat belt 31 shown in FIG. 2 may be used. In this case the elastic member 23 is in contact with the surface 32 and the end face 33 on the other side of the flat belt 31, pressing the flat belt 31 against the tray T.

The tray conveyor of the present invention has the following excellent effect.

The elastic member having a curved cross section is mounted on the opposite side of the surface of the conveyor belt for conveying the trays in a vertical direction and extended in the direction of travel of conveyor. This elastic member of such a simple construction, therefore, can apply a uniform pressure to the conveyor belt. It is, therefore, possible to reduce the number of component parts and mounting manhours, to prevent tray jamming on the conveyor, and to simplify the conveyor belt.

What is claimed is:

1. A tray conveyor having an elastic member which has a convex cross section, extending in the direction of travel of conveyor, on the opposite side of the surface of a conveyor belt for vertical conveyance of trays.

2. A tray conveyor as claimed in claim 1, wherein said conveyor belt is a round belt having a round section.

3. A tray conveyor as claimed in claim 1, wherein said elastic member is produced of a steel sheet having a specific thickness, and the top portion of the elastic member contacts with the conveyor belt.

4. A tray conveyor as claimed in claim 3, wherein said elastic member is housed within a guide member which is constituted to have a square section and to have an opening section, in said opening section the round belt being located.

5. A tray conveyor as claimed in claim 4, wherein a tray guide for guiding the tray is installed at the end on the opening side of said guide member and is formed to engage with the bobbin-side surface of the tray, so that the tray is carried upward and downward by the circulating drive of the conveyor belt, being held between the conveyor belt and the tray guide.

6. A tray conveyor as claimed in claim 1, wherein said conveyor belt is a flat belt.

* * * * *